Aug. 31, 1948.  E. THYS  2,448,063
MACHINE FOR STRIPPING HOPS FROM VINES
Filed Aug. 28, 1944
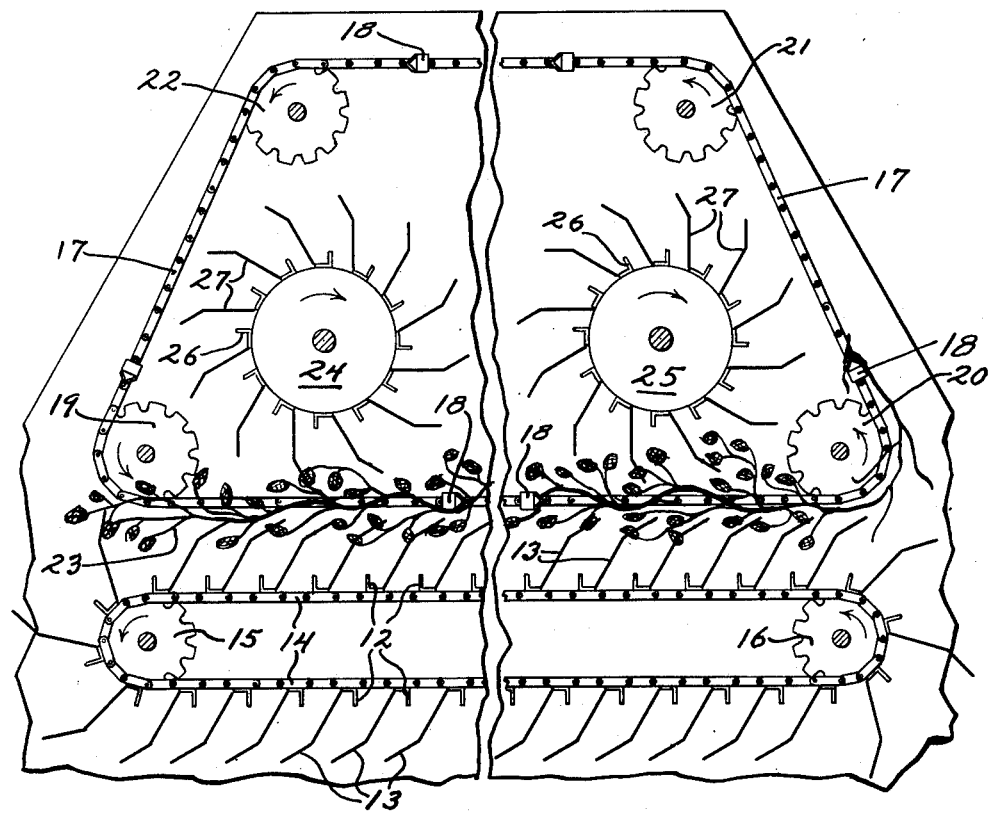
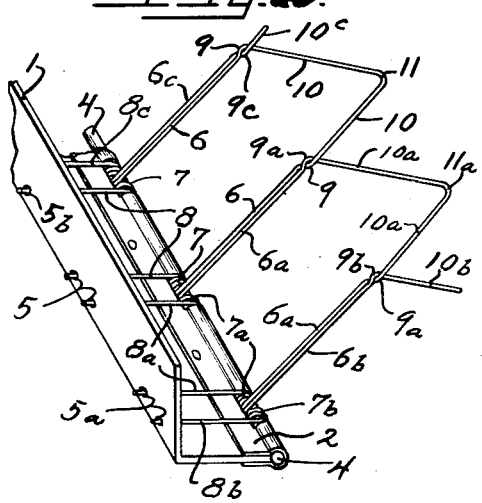
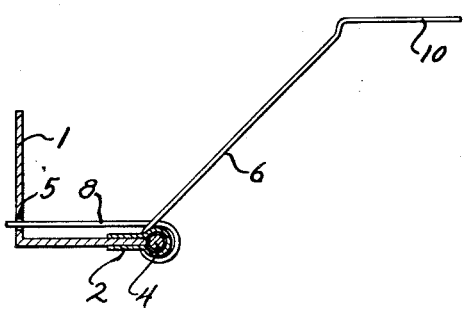
INVENTOR,
EDOUARD THYS.
BY
Chas. E. Townsend
ATTORNEY.

Patented Aug. 31, 1948

2,448,063

UNITED STATES PATENT OFFICE 2,448,063

MACHINE FOR STRIPPING HOPS FROM VINES

Edouard Thys, Sacramento, Calif., assignor to Thys and Miller, Sacramento, Calif., a copartnership Application August 28, 1944, Serial No. 551,457

23 Claims. (Cl. 130—30)

This invention relates to means for mechanically picking hops and has particular reference to the picker fingers and bars for supporting the same, by which the hop blossoms and clusters are mechanically removed from the vines when the latter pass through the machine.

The present invention is particularly adapted for use with portable hop picking machines, as illustrated by my prior Patent No. 2,187,526 of January 16, 1940, or in machines of the stationary type as illustrated in Patent No. 1,054,551 of February 25, 1913. The picker fingers as commonly used in these machines are usually made of steel wire, formed into a V-shaped member, open at the front, with the apex of the V permanently closed and the legs or extensions of the sides of the V being variously held according to the type or design of the machine.

The anchorage for these finger extensions is usually in what is called a finger bar extending across the machine and each bar adapted to carry a number of fingers. These finger bars are carried either on endless belt conveyors or drums and move counterwise to the travel of the hop vine which is adapted, by appropriate means, to traverse the machine so that the hop blossoms are brought into contact with the fingers and removed by the latter.

It is desirable that the legs or extensions of the V-shaped pickers be flexibly or yieldingly connected to the bar to adapt them to the varying diameters of the hop vines and to allow the fingers to spring back and forth without danger of breakage.

The hops grow on long bushy vines 12 to 18 feet in length on flexible supports strung from trellises. In harvesting, the vines are cut and transported to the picking machines and the stem of the vines secured to gripper bars, as for example of the type shown in my prior Patent No. 2,193,354 of March 12, 1940, and carried on endless chains through the picking machine.

In my prior Patent No. 2,191,183 of February 20, 1940, an effort was made to achieve this desired result by the use of a finger bar of the type in which the fingers were coiled about the bar and anchored at one end, but it was found that this type of construction was unsatisfactory for a variety of reasons, particularly in the matter of replacing broken fingers. In the heavy, continued and intensive usage that these machines are subjected to during the short hop picking season, it is desirable to keep the machine in operation with a minimum of interruption for repairs.

By the present invention the fingers may be replaced at any point along the bar by an unskilled worker in a minimum of time.

The present invention resides in two features: one, in the bar itself and the other in the interlocking finger construction. In order to secure uniform picking action, it is necessary that the picking fingers be tied together across the finger bar in such a manner that the fingers flex more or less as a unit. In the tie construction heretofore commonly employed and illustrated, for example, in my prior Patent No. 2,191,183 of February 20, 1940, it has been found that considerable time and effort are required to replace a broken or damaged picking finger.

It is an object of the present invention to provide improved hop picking finger and finger bar construction. A further object is to provide a finger bar arrangement permitting facile and rapid replacement of any picking finger supported thereby. Another object is to provide picking fingers which are mutually supporting and which flex as a unit and which at the same time are readily detachable from each other and from the finger bar. A still further object is to provide a finger bar and picking finger arrangement obviating the use of clamps, ties, pins or other fastening means for the individual fingers, all of the fingers being secured to the finger bar by a single master pivot pin of readily detachable character. Other objects, together with some of the advantages to be derived in utilizing the construction of the present invention, will become apparent from the following detailed description thereof, taken together with the accompanying drawings forming a part of the specification, and wherein:

Figure 1 is a vertical cross section of a typical hop picking machine suitable for use with the hop picking fingers and finger bar of the present invention.

Figure 2 is a perspective view of a portion of a finger bar with the picking fingers attached thereto, in accordance with the invention.

Figure 3 is a sectional end elevation of the finger bar assembly shown in Figure 2.

The present invention contemplates a finger bar assembly with each picking finger positioning and supporting each adjacent picking finger in interlocking and interlacing relationship therewith whereby the picking fingers are mutually supported and flex in unison. A second feature of the invention lies in the construction of the finger bar and its supporting relationship with the picking fingers, coils provided on the picking fingers fitting into suitable notches in a cylindrical member provided on one edge of one flange of the finger bar which is preferably formed as an angle bar. The cylindrical member receives a pivot pin which passes successively through each of the coils provided on the picking fingers.

Referring particularly to Figures 2 and 3, which illustrate the detail of the finger bar assembly, the finger bar comprises an angle bar 1, a tubular member 2 of special shape being rigidly attached thereto on one edge of one flange of angle bar 1. Each picking finger is formed from spring steel wire or equivalent material and is bent upon itself to form a V-shaped finger 11 with side arms 10 and support arms 6. The ends of support arms 6 are wound around a mandrel to form coils as at 7 and terminate in a pair of extensions as at 8 which serve as positioning arms. The member 2 is notched at intervals, each notch being of sufficient width to accommodate two of the coil springs formed at the base of support arms 6. The flange of angle bar 1 which is at an angle to the flange supporting the member 2 is provided with a pair of holes as at 5 opposite each notch in cylindrical member 2, these holes serving to secure extensions 8 which pass therethrough. A pivot pin 4 is slidably supported in the member 2 and passes through the coils 7 formed as a part of the picking fingers. The member 2 is tubular for the reception of the pivot pin and the general configuration of the member 2 is cylindrical where it encloses the pin 4. As shown in Figures 2 and 3, the tubular portion of the member 2 containing the pin 4 is provided with two lateral extending plate-like portions which are spaced from each other in parallel relation so as to receive between them one flange of the angle bar 1 to which they are secured, thus to mount the tubular portion on the angle bar.

Each picking finger is provided with a crimp at the junction of each side arm 10 with each support arm 6, as shown at 9. This crimp includes a bend which extends laterally away from the main line of the supporting arm and also upwardly as shown in Figure 2 and Figure 3. The picking fingers, as positioned in the finger bar, are arranged with support arms 6 passing alternately over and beneath the support arms of adjacent picking fingers, the crimps as at 9 interlocking and permitting the desired interlacing of the support arms without consequent misalignment in a horizontal plane of adjacent picking fingers. Side arms 10 are similarly disposed with respect to adjacent side arms, for example, in Figure 2, support arm 6 passes under support arm 6a of the adjacent picking finger near coils 7 and 7a and side arm 10 passes over side arm 10a immediately beyond crimps 9 and 9a. In like manner support arm 6c passes under the other support arm 6 and side arm 10c passes over side arm 10 as shown. Since side arms 10 are bent forwardly at an angle to the support arms 6, as shown in Figure 3, the combination of the outward bend provided by crimp 9 together with the forward bend at this point resulting from the angle between side arm 10 and support arm 6 provides horizontal alignment of the picking fingers regardless of the fact that the support arms and side arms of adjacent picking fingers pass alternately above and beneath each other. By means of the crimps as at 9, not only is the desired horizontal alignment maintained but at the same time the interlocking action of the crimps prevents rotational movement of a single picking finger with respect to adjacent picking fingers.

The unit is assembled by placing the positioning arms, as for example 8—8, in holes 5 and 5b of finger bar 1 and then positioning coils 7—7 in adjacent notches in cylindrical member 2. Pivot pin 4 is then passed through cylindrical member 2 and finger coils 7—7, thus securing the picking finger in the position shown in Figure 3. Positioning arms 8 prevent rotation of the picking fingers about the axis of pivot pin 4. The picking finger is removed by simply withdrawing pivot pin 4 from cylindrical member 2.

In the assembly shown in Figure 2, it will be seen that as each picking finger is positioned in the finger bar, pivot pin 4 may be passed through cylindrical member 2 a distance sufficient to hold the picking finger placed, whereupon the next picking finger is positioned as described above, care being taken to provide the over and under relationship of the support arms and side arms hereinbefore described, and pivot pin 4 further passed through cylindrical member 2 a distance sufficient to secure the last placed picking finger. In this manner, the entire length of the finger bar may be supplied with picking fingers. If one or more of the picking fingers become damaged during operation, it may be readily and quickly replaced with a new one by simply withdrawing pivot pin 4 sufficiently to release the defective element and permit substitution of a new finger, the non-defective fingers released by the withdrawal of pivot pin 4 in order to remove the defective finger being held in position by positioning arms 8, which pass through finger bar 1, until pivot pin 4 is again reinserted through the full length of the finger bar.

Figure 1 illustrates a typical hop picking machine in conjunction with which the finger bar assembly of the present invention and described in detail above, may be utilized. The vine carrying arrangement comprises a number of endless chains as at 17 to which is affixed at interval vine grasper bars as at 18 which may be of the type described in my prior Patent No. 2,193,354 of March 12, 1940. Chains 17 are mounted on and driven in the direction of the arrows by means of sprocket wheels 19, 20, 21 and 22. Positioned above and adjacent to the vine carrying arrangement are a number of picking drums, as at 24 and 25, on the periphery of which are mounted a plurality of finger bar assemblies such as those shown in Figures 2 and 3 and indicated generally at 26 and 27. Mounted beneath and adjacent to the vine carrying arrangement is a picking conveyor 14 on which is mounted a plurality of finger bar assemblies of the type hereinbefore described and indicated generally at 12 and 13. Conveyor 14 is supported on and driven by sprocket wheels 15 and 16. Picking drums 24 and 25 and picking conveyor 14 travel in the opposite direction from that of vine conveyor 17, the picking fingers mounted on the picking drums and picking conveyor thoroughly combing the hop vine and removing substantially all of the hop blossoms as the vine travels between the drums and conveyor.

While certain features of the present invention have been more or less specifically described and illustrated, it will be appreciated that variations therein may be resorted to within the scope of the appended claims, and that materials and finishes employed may be such as the maker desires or varying conditions demand.

Having thus described and illustrated my invention, that which I claim and desire to secure by Letters Patent is:

1. In a hop picking machine, a finger bar assembly comprising in combination, a finger bar including notched pivot-pin-receiving-means, a plurality of picking fingers disposed in row formation along said finger bar, pivot pin engaging means at the base of each of said fingers and disposed in the notches in said pivot pin receiving means, a pivot pin slidably and releasably received in said pivot pin receiving means and said pivot pin engaging means, and means to limit the rotative movement of the fingers on said pivot pin, said last named means comprising a freely slidable connection to connect releasably each of said fingers to said finger bar.

2. In a hop picking machine, a finger bar assembly comprising in combination, a finger bar including notched pivot-pin-receiving-means along an edge thereof, a plurality of picking fingers disposed in row formation along said finger bar, pivot pin engaging means at the base of each of said fingers and disposed in the notches in said pivot-pin-receiving-means and a pivot pin slidably and releasably received in said pivot-pin-receiving-means and said pivot pin engaging means in slidable and detachable relationship therewith, thereby releasably securing said fingers to said finger bar, and means to limit the rotative movement of the fingers around said pivot pin, said last named means comprising a freely slidable connection to connect releasably each of said fingers to said finger bar.

3. In a hop picking machine, a finger bar assembly comprising in combination, a finger bar including notched pivot-pin-receiving-means along an edge thereof, a plurality of picking fingers disposed in row formation along said finger bar, pivot pin engaging means at the base of each of said fingers and disposed in the notches in said pivot-pin-receiving-means, a pivot pin passing through said pivot pin receiving means and said pivot pin engaging means in slidably detachable relationship therewith, thereby releasably securing said fingers to said finger bar and means formed as a part of said pivot pin engaging means in slidably detachable engagement with said finger bar and securing said fingers against rotation around the longitudinal axis of said pivot pin.

4. In a hop picking machine, a finger bar assembly comprising in combination, an angle bar including a pivot pin receiving element provided with a plurality of spaced notches along the edge of a first flange of said angle bar, a plurality of V-shaped wire fingers disposed in row formation along said angle bar, pivot pin engaging means at the base of each of said fingers and disposed in the notches in said pivot pin receiving element, a pivot pin passing through said pivot pin receiving element and said pivot pin engaging means in slidably releasable engagement therewith, thereby securing said fingers to said angle bar and extensions of said pivot pin engaging means in slidably detachable engagement with the second flange of said angle bar and thereby securing said fingers against rotation around the longitudinal axis of said pivot pin.

5. In a finger bar assembly of the class described, the combination comprising an angle bar, a notched pivot pin receiving element of cylindrical configuration provided with a plurality of spaced notches and rigidly secured along the edge of a first flange of said angle bar, a plurality of V-shaped wire fingers disposed in row formation along said angle bar, pivot pin engaging coils formed at the base of each of said fingers and disposed in the notches in said pivot pin receiving element, a pivot pin passing through said pivot pin receiving element and said finger coils in slidable engagement therewith, thereby detachably securing said fingers to said finger bar, and extensions formed as a part of said finger coils in slidably detachable engagement with the second flange of said angle bar, thereby securing said fingers against rotation around the longitudinal axis of said pivot pin.

6. In a finger bar assembly of the class described, the combination comprising an angle bar including a first flange and a second flange provided with a plurality of perforations in row formation, a notched pivot pin receiving element of cylindrical configuration provided with a plurality of spaced notches and rigidly secured along the edge of said first flange of said angle bar, a plurality of V-shaped wire fingers disposed in row formation along said angle bar, pivot pin engaging coils formed at the base of each of said fingers and disposed in the notches in said pivot pin receiving element, a pivot pin passing through said pivot pin receiving element and said finger coils in slidable engagement therewith, thereby detachably securing said fingers to said angle bar and extensions formed as a part of said finger coils passing through the perforations in said second flange of said angle bar, thereby securing said fingers against rotation around the longitudinal axis of said pivot pin.

7. In a finger bar assembly of the class described, the combination comprising a finger bar including notched pivot-pin-receiving-means along an edge thereof, a plurality of disengagably interlocked picking fingers disposed in row formation along said finger bar, each of said picking fingers comprising a pair of side arms forming a V apex and a pair of substantially parallel support arms formed as a part of said side arms, pivot pin engaging means formed at the base of each of said support arms and disposed in the notches in said pivot-pin-receiving-means, said side arms and support arms of each of said picking fingers passing alternately under and over the side arms and support arms of adjacent picking fingers and thereby securing each of said picking fingers against rotation with respect to adjacent picking fingers, and a pivot pin passing through said pivot-pin-receiving-means and said pivot pin engaging means in slidable and detachable relationship therewith, thereby releasably securing said picking fingers to said finger bar.

8. In a finger bar assembly of the class described, the combination comprising an angle bar including a notched pivot-pin-receiving-element along the edge of a first flange of said angle bar, a plurality of wire disengageably interlocked picking fingers disposed in row formation along said angle bar, each of said picking fingers comprising a pair of side arms forming a V apex and a pair of substantially parallel support arms formed as a part of said side arms, pivot-pin-engagingmeans formed at the base of each of said support arms and disposed in the notches in said pivot-pin-receiving-means, extensions formed as a part of said pivot-pin engaging means and detachably engaging the second flange of said angle bar, said side arms and support arms of each of said picking fingers passing alternately under and over the side arms and support arms of adjacent picking fingers and thereby securing each of said picking fingers against rotation with respect to adjacent picking fingers and a pivot pin passing through said pivot-pin-receiving-means and said pivot pin engaging means in slidable and detachable relationship therewith, thereby releasably securing said picking fingers to said finger bar.

9. In a finger bar assembly of the class described, the combination comprising an angle bar including a first flange and a second flange provided with a pluraltiy of perforations in row formation, a notched pivot pin receiving element of cylindrical configuration rigidly secured along the edge of said first flange of said angle bar, a plurality of wire picking fingers disposed in row formation along said angle bar, each of said picking fingers comprising a pair of side arms forming a V apex and a pair of substantially parallel support arms formed as a part of said side arms, pivot pin engaging coils formed at the base of each of said support arms and disposed in the notches in said pivot pin receiving element, extensions formed as a part of said finger coils and passing through the perforations in said second flange of said angle bar, an outwardly extending crimp formed at the junction of each of said side arms and said support arms, said side arms and support arms of each of said picking fingers passing alternately under and over the side arms and support arms of adjacent picking fingers and said outwardly extending crimps interlocking, thereby securing each of said picking fingers against rotation with respect to adjacent picking fingers and a pivot pin passing through said pivot pin receiving element and said finger coils in slidable engagement therewith, thereby detachably securing said fingers to said angle bar.

10. A picking finger assembly for hop picking machines comprising in combination, an angle bar, a spring steel wire bent centrally to form a V-shaped picking member to embrace a hop vine branch behind a hop blossom, the legs of the V extended and coiled to form co-axial eyes, a pivot pin passing through said eyes, means on one flange of the angle bar cooperating with the said pivot pin to form an articulation between the finger and the bar and the free ends of the picker finger extending beyond the pivot and in freely slidable detachable engagement with the other flange of the angle bar to limit the rotating movement of the finger about the pivot pin.

11. In a finger bar assembly of the class described, the combination comprising a finger and a plurality of picking fingers interlocked slidably and disengageably and mounted in row formation along said finger bar, each of said picking fingers comprising a pair of side arms forming a V apex and a pair of support arms formed as extensions of said side arms and mounted on said finger bar, said side arms and support arms of each of said picking fingers on one side leading from the finger bar outwardly passing alternately under and over the side arms and support arms of adjacent picking fingers and under and over on the side leading to the finger bar, said slidably interlocked picking fingers mutually supporting one another, said under and over relation of said arms including a partial encirclement of an arm by an adjacent arm and in which partial encirclement neither one of two adjacent arms pass completely around the other.

12. In a finger bar assembly of the class described, the combination comprising a finger bar and a plurality of picking fingers interlocked slidably and disengageably and mounted in row formation along said finger bar, and a pivot pin held in said finger bar and on which pin said fingers are mounted, each of said picking fingers comprising a pair of side arms forming a V apex and a pair of substantially parallel support arms formed as a part of said side arms and mounted on said finger bar, an outwardly extending crimp formed at the junction of each of said side arms and support arms, said side arms and support arms of each of said picking fingers passing alternately under and over the side arms and support arms of adjacent picking fingers and said outwardly extending crimps interlocking, thereby securing each of said picking fingers against rotation with respect to adjacent picking fingers, said slidably interlocked picking fingers mutually supporting one another, said under and over relation of said arms including a partial encirclement of an arm by an adjacent arm and in which partial encirclement neither one of two adjacent arms pass completely around the other.

13. In a finger bar assembly of the class described, the combination comprising a finger bar, a plurality of picking fingers interlocked slidably and disengageably and detachably mounted in row formation along said finger bar, and means securing each of said picking fingers against rotation about the longitudinal axis of said finger bar, and a pivot pin held in said finger bar and on which pin said fingers are mounted, each of said picking fingers comprising a pair of side arms forming a V apex and a pair of substantially parallel support arms formed as a part of said side arms and mounted on said finger bar, an outwardly extending crimp formed at the junction of each of said side arms and support arms, said side arms and support arms of each of said picking fingers passing alternately under and over the side arms and support arms of adjacent picking fingers and said outwardly extending crimps interlocking, thereby securing each of said picking fingers against rotation with respect to adjacent picking fingers, said slidably interlocked picking fingers mutually supporting one another, said under and over relation of said arms including a partial encirclement of an arm by an adjacent arm and in which partial encirclement neither one of two adjacent arms pass completely around the other.

14. In a finger bar assembly the combination comprising a finger bar, a pivot pin carried by said finger bar, a plurality of disengageably interlocked picking fingers carried by said pin and removably mounted in row formation thereon, and means formed integrally with said fingers for slidable connection with said pin, said disengageably interlocked picking fingers mutually supporting one another, the disengageable relation of said interlocked picking fingers including a partial encirclement of a finger by an adjacent finger and in which partial encirclement neither of two adjacent fingers pass completely around the other.

15. In a finger bar assembly, the combination comprising a finger bar, a pivot pin slidably carried by said finger bar, and a plurality of slidably disengageably interlocked picking fingers removably carried by said pivot pin, each of said fingers being slidably removable from the assembly relative to other fingers, and means to connect slidably said fingers to said pin, said slidably disengageable interlocked picking fingers mutually supporting one another, the disengageable interlocked relation of said picking fingers including a partial encirclement of a finger by an adjacent finger and in which partial encirclement neither of two adjacent fingers pass completely around the other.

16. In a finger bar assembly the combination of a finger bar, picking finger support means carried by said finger bar, a plurality of slidably disengageable interlocked picking fingers mounted removably and in row formation on said support means, and means, including a connection slidable with respect to said support means and with respect to said fingers to prevent movement of said fingers in at least one direction relative to said support means, said slidably disengageable interlocked picking fingers mutually supporting one another, the disengageable interlocked relation of said picking fingers including a partial encirclement of a finger by an adjacent finger and in which partial encirclement neither of two adjacent fingers pass completely around the other.

17. In a finger bar assembly the combination of a finger bar, picking finger support means slidably and removably carried by said finger bar, a plurality of picking fingers interlocked slidably and disengageably and mounted slidably and removably on said support means whereby a single picking finger may be slidably removed from the assembly relative to another picking finger, with which it is slidably interlocked, the disengageable interlocked relation of said picking fingers including a partial encirclement of a finger by an adjacent finger and in which partial encirclement neither of two adjacent fingers pass completely around the other.

18. A picking finger having a substantially V-shaped picking portion and wherein the sides of the V are extended to form substantially parallel leg portions, said leg portions provided with means to anchor said finger to a finger bar, each of said legs at the point of juncture with the sides of the V having complementary bends extending out of the plane common to the main length of the legs whereby each leg may be coupled to similar adjacent legs by hooking them together, the major portion of the length of both of said legs lying in the same plane, said complementary bends including a partial encirclement of a finger by an adjacent finger and in which partial encirclement neither of two adjacent fingers pass completely around the other.

19. A wire picking finger having a substantially V-shaped picking portion and wherein the sides of the V are extended to form substantially parallel leg portions, each of said leg portions provided with means to anchor said finger to a finger bar, said means comprising hollow coils adapted for slidable reception of a finger bar, and each of said coils terminating in a straight portion, each of said legs at the point of juncture with the sides of the V having complementary bends extending out of the plane common to the main length of the legs whereby each leg may be coupled to similar adjacent legs by hooking them together, the major portion of the length of both of said legs lying in the same plane, said complementary bends including a partial encirclement of a finger by an adjacent finger and in which partial encirclement neither of two adjacent fingers pass completely around the other.

20. In a finger bar assembly of the class described, the combination comprising a finger bar having a tubular finger bearing element and spacing members with openings therebetween for the reception of hop picking fingers, a plurality of hop picking fingers in row formation slidably mounted in each opening on said tubular element, adjacent fingers being disengageably interlocked with each other and mutually supporting one another, the said interlocked relation of adjacent fingers including a partial encirclement of a finger by an adjacent finger and in which partial encirclement neither of two adjacent fingers pass completely around the other.

21. A picking finger having a substantially V-shaped picking portion wherein the sides of hte V are extended to form substantially parallel leg portions, said leg portions being provided with means to anchor said finger to a finger supporting bar, the major portion of the length of each leg being straight and each of said legs at the point of juncture at the sides of the V having bends extending in opposite directions and out of the line of the length of the leg, whereby the fingers may be interlocked so as to mutually support one another and be slidably disengageable with respect to one another, the said bends of adjacent fingers including a partial encirclement of a finger by an adjacent finger and in which partial encirclement neither of two adjacent fingers pass completely around the other.

22. A picking finger having a substantially V-shaped picking portion and wherein the sides of the V are extended to form leg portions spaced from each other and extending in the same direction, and each leg portion being provided with means to anchor said finger to a finger supporting bar, each of said legs at the point of juncture with the sides of the V having complementary bends extending out of line from the line of the leg whereby each leg may be coupled to adjacent legs by hooking them together, said complementary bends of adjacent fingers including a partial encirclement of a finger by an adjacent finger and in which partial encirclement neither of two adjacent fingers pass completely around the other.

23. In a finger bar assembly of the class described, a combination comprising a finger bar including a pivot pin and a plurality of generally U-shaped wire picking fingers arranged in overlapping relation and mounted in row formation along said finger bar and with adjacent fingers interlocked slidably and disengageably from each other, each of said picking fingers comprising a pair of side arms forming a V apex and a pair of substantially parallel support arms formed as extensions of said side arms, each support arm and its respective side arm constituting one side of the picking finger, each of said support arms having a coil through which said pivot pin is removably extended whereby said support arms are mounted on said finger bar, each intermediate picking finger extending from one coil outwardly to the V apex and thence back to the other coil, and having a first of said pair of support arms extending outwardly from a coil and in contact with and extending substantially lengthwise of a support arm of the adjacent picking finger, thence passing under and over the adjacent side of said adjacent picking finger, thence to the apex of the V, thence as a second side arm back to the second support arm of said pair, thence passing under and over the adjacent side of a second adjacent picking finger, and thence extending along said second support arm toward said finger bar and in contact with and extending substantially lengthwise of the supporting arm of said second adjacent picking finger and to that coil at the finger bar end of said second support arm.

EDOUARD THYS.

REFERENCES CITED

The following references are of record in the file of this patent:

UNITED STATES PATENTS

| Number | Name | Date |
|---|---|---|
| 912,835 | Ferguson | Feb. 16, 1909 |
| 968,001 | Trowbridge | Aug. 23, 1910 |
| 1,704,805 | Morris | Mar. 12, 1929 |
| 2,191,183 | Thys | Feb. 20, 1940 |

FOREIGN PATENTS

| Number | Country | Date |
|---|---|---|
| 512,540 | Great Britain | Sept. 19, 1939 |